United States Patent
Park et al.

(10) Patent No.: US 9,602,872 B2
(45) Date of Patent: Mar. 21, 2017

(54) DISPLAY APPARATUS AND CONTROL METHOD THEREOF

(71) Applicant: SAMSUNG ELECTRONICS CO., LTD., Suwon-si (KR)

(72) Inventors: Kyoung-jae Park, Daejeon (KR); Byoung-hyun Kim, Suwon-si (KR); Sang-yoon Kim, Yongin-si (KR); Ki-jun Jeong, Seoul (KR); Eun-heui Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/609,070

(22) Filed: Jan. 29, 2015

(65) Prior Publication Data
US 2015/0215672 A1    Jul. 30, 2015

(30) Foreign Application Priority Data

Jan. 29, 2014  (KR) .......................... 10-2014-0011700

(51) Int. Cl.
*H04H 60/33* (2008.01)
*H04N 21/462* (2011.01)
(Continued)

(52) U.S. Cl.
CPC .......... *H04N 21/462* (2013.01); *G06F 3/011* (2013.01); *G06F 3/013* (2013.01);
(Continued)

(58) Field of Classification Search
CPC ..................... H04N 21/4126; H04N 21/42201
See application file for complete search history.

(56) References Cited

U.S. PATENT DOCUMENTS 5,550,928 A * 8/1996 Lu ..................... G06K 9/00221
                                                        382/103
6,020,882 A * 2/2000 Kinghorn ............... H04H 60/16
                                                        348/E5.099
(Continued)

FOREIGN PATENT DOCUMENTS

EP             2336868 A1    6/2011
KR    10-2010-0072411 A     7/2010
(Continued)

OTHER PUBLICATIONS

Communication issued on Aug. 3, 2015 by the European Patent Office in related Application No. 15151235.7.
(Continued)

*Primary Examiner* — James R Sheleheda
*Assistant Examiner* — Timothy Newlin
(74) *Attorney, Agent, or Firm* — Sughrue Mion, PLLC

(57) ABSTRACT

A display apparatus includes: a display; a data processor configured to process content data to be displayed as a content image on the display; a user input interface configured to receive biometric information about a user; a communication interface configured to communicate with an external apparatus; and a controller configured to identify the user based on the biometric information received through the user input interface, and control, if it is determined that the identified user is also a user of an external apparatus, the content data to be displayed as the content image on one of the display apparatus and the external apparatus in which a user interest is relatively high.

17 Claims, 10 Drawing Sheets

(51) Int. Cl.
  *H04N 21/4415* (2011.01)
  *H04N 21/4223* (2011.01)
  *H04N 21/442* (2011.01)
  *H04N 21/422* (2011.01)
  *H04N 21/2668* (2011.01)
  *H04N 21/41* (2011.01)
  *G06F 3/01* (2006.01)

(52) U.S. Cl.
  CPC ..... *H04N 21/2668* (2013.01); *H04N 21/4126* (2013.01); *H04N 21/4223* (2013.01); *H04N 21/42203* (2013.01); *H04N 21/4415* (2013.01); *H04N 21/44218* (2013.01)

(56) References Cited

U.S. PATENT DOCUMENTS

| | | | |
|---|---|---|---|
| 6,118,888 A * | 9/2000 | Chino | G06F 3/011 382/118 |
| 8,421,746 B2 * | 4/2013 | Igoe | H04L 12/2809 345/1.1 |
| 2007/0165812 A1 * | 7/2007 | Lee | G06F 17/30032 379/201.01 |
| 2008/0141329 A1 * | 6/2008 | Igoe | H04L 12/2809 725/141 |
| 2008/0298571 A1 * | 12/2008 | Kurtz | H04N 7/142 379/156 |
| 2009/0310029 A1 * | 12/2009 | Tanaka | H04N 7/17318 348/729 |
| 2010/0107184 A1 * | 4/2010 | Shintani | H04N 21/4436 725/10 |
| 2010/0205628 A1 | 8/2010 | Davis et al. | |
| 2010/0295839 A1 * | 11/2010 | Nagaya | G06F 1/3265 345/212 |
| 2011/0131502 A1 * | 6/2011 | Ryu | G06F 3/017 715/744 |
| 2011/0135114 A1 * | 6/2011 | Oba | G06F 1/3203 381/107 |
| 2011/0267374 A1 * | 11/2011 | Sakata | G06F 3/013 345/672 |
| 2012/0060109 A1 | 3/2012 | Han et al. | |
| 2012/0062471 A1 * | 3/2012 | Poulidis | H04N 5/4403 345/173 |
| 2013/0212606 A1 * | 8/2013 | Kannan | H04N 21/4667 725/12 |
| 2013/0215250 A1 * | 8/2013 | Pasquero | H04N 21/42201 348/78 |
| 2013/0234826 A1 * | 9/2013 | Sekiguchi | G06F 3/013 340/5.53 |
| 2013/0326555 A1 * | 12/2013 | McMahon | H04N 21/25891 725/38 |
| 2015/0020086 A1 * | 1/2015 | Chen | H04N 21/44218 725/12 |

FOREIGN PATENT DOCUMENTS

KR  10-2012-0028757 A   3/2012
KR  10-2013-0097591 A   9/2013

OTHER PUBLICATIONS

Lee et al., "Platform Design of Screen Share, and Control for N-Screen Mirroring", Autumn Symposium Paper Collection of Korean Internet Information Society, 3 pages total, vol. 13 No. 2.

* cited by examiner

DISPLAY APPARATUS AND CONTROL METHOD THEREOF

CROSS-REFERENCE TO RELATED APPLICATION

This application claims priority from Korean Patent Application No. 10-2014-0011700, filed on Jan. 29, 2014 in the Korean Intellectual Property Office, the disclosure of which is incorporated herein by reference in its entirety.

BACKGROUND

Field

Apparatuses and methods consistent with one or more exemplary embodiments relate to a display apparatus which processes image data of various content to be displayed as a content image and a control method thereof, and more particularly to a display apparatus which has a structure for efficiently offering a content image to a user in accordance with his/her interest in the display apparatus and an external apparatus when a user uses the display apparatus together with the external apparatus, and a control method thereof.

Description of the Related Art

An image processing apparatus processes an image signal/image data received from an exterior source through various image processing processes. The image processing apparatus may include a display panel that displays a processed image signal as an image on the display panel, or may output a processed image signal to another apparatus having a display panel so that the processed image signal can be displayed as an image by the other apparatus. Here, the image processing apparatus having the former structure will be called a display apparatus. A television (TV) is a non-limiting example of a display apparatus.

With development of technology, additional functions of the display apparatus and various kinds of display apparatuses have been provided to users. For example, a user may use a plurality of display apparatuses such as a TV, a portable multimedia player, a mobile phone, etc., all together. Many kinds of display apparatus and various content has been designed to be easily controlled by a user to view content images, not only on a TV, but also on a tablet personal computer (PC), a portable multimedia player, a mobile phone, and the like.

If a user who is viewing a content through one display apparatus desires to view the same content through another display apparatus, i.e. an external apparatus, it is conventionally inconvenient for a user to control user input interfaces of the external apparatus so that the external apparatus can acquire and reproduce the corresponding content. Therefore, it will be convenient for the user if there is provided a structure or environment where a content image displayed on the display apparatus can be also displayed on the external apparatus without any separate control.

SUMMARY

In accordance with an exemplary embodiment, there is provided a display apparatus including: a display; a data processor configured to process content data to be displayed as a content image on the display; a user input interface configured to receive biometric information about a user; a communication interface configured to communicate with an external apparatus; and a controller configured to identify the user based on the biometric information received through the user input interface, and control, if it is determined that the identified user is also a user of an external apparatus, the content data to be displayed as the content image on one of the display apparatus and the external apparatus in which a user interest is relatively high.

The interest in the display apparatus may be calculated based on at least one of a position of the user's face and a direction of the user's pupil with respect to the display apparatus.

The user input interface may include a camera configured to capture an image of the user's face, and the controller determines the interest based on an angle between an axial line, toward which the user's face is directed, and a straight line connecting the camera and the user's face.

The controller may determine that the user interest in the display apparatus is high when the angle approximates 0, and that the interest in the display apparatus decreases as the angle increases.

If it is determined that a user interest in the external apparatus is relatively high in comparison to the user interest in the display apparatus while the communication interface receives the content data, the controller may be further configured to transmit the content data to the external apparatus so that the external apparatus can display the content image.

When one of the display apparatus and the external apparatus is currently displaying the content image and if it is determined that the user interest in the display apparatus and the user interest in the external apparatus are both higher than a preset first value or both lower than a preset second value, the controller is further configured to control the one of the display apparatus and the external apparatus currently displaying the content image to continue displaying the content image.

The display apparatus may further include a storage configured to store at least one user identification (ID) and reference biometric information corresponding to the ID, wherein the controller may identify the user by selecting the reference biometric information, which corresponds to the biometric information input to the user input interface, among the at least one reference biometric information stored in the storage, and verifying the ID corresponding to the selected reference biometric information.

The user input interface may include a camera configured to capture an image of the user's face and a microphone configured to receive the user's voice, and the controller may identify the user based on at least one of the image captured by the camera and the user's voice received by the microphone.

If there are a plurality of identified users of both the display apparatus and the external apparatus, the controller may control the content data to be displayed as the content image on one of the display apparatus and the external apparatus based on a user interest of one identified user among the plurality of identified users specified by an event when the event is generated for specifying the one identified user among the plurality of identified users.

In accordance with another exemplary embodiment, there is provided a method of controlling a display apparatus, the method including: processing content data to be displayed as a content image; communicating with an external apparatus; identifying a user based on biometric information received in the display apparatus; selecting, if it is determined that the identified user is also a user of an external apparatus, one of the display apparatus and the external apparatus in which a user interest is relatively high; and controlling the content data to be transmitted to be displayed as the content image on the selected one.

The interest in the display apparatus may be calculated based on at least one of a position of the user's face and a direction of the user's pupil with respect to the display apparatus.

The selecting one of the display apparatus and the external apparatus may include: capturing an image of the user's face; and determining a user interest in the display apparatus based on an angle between an axial line, toward which the user's face is directed, and a straight line connecting the user's face and a camera provided in the display apparatus configured to capture an image of the user's face.

It may be determined that the interest in the display apparatus is high when the angle approximates 0, and that the user interest in the display apparatus decreases as the angle increases.

The controlling the content data to be transmitted may include: transmitting, if it is determined that a user interest in the external apparatus is relatively high in comparison to the user interest in the display apparatus while the display apparatus receives the content data, the content data to the external apparatus so that the external apparatus can display the content image.

The selecting one of the display apparatus and the external apparatus may include: controlling, when one of the display apparatus and the external apparatus is currently displaying the content image and if it is determined that the user interest in the display apparatus and the user interest in the external apparatus are both higher than a preset first value or both lower than a preset second value, the one of the display apparatus and the external apparatus currently displaying the content image to continue displaying the content image.

The identifying the user may include: selecting the reference biometric information, which corresponds to the biometric information input to the user input interface, from a database storing at least one user identification (ID) and reference biometric information corresponding to the ID; and verifying the ID corresponding to the selected reference biometric information.

The identifying the user may include: generating the biometric information based on at least one of an image of the user's face captured by a camera of the display apparatus and the user's voice received by a microphone of the display apparatus.

The selecting one of the display apparatus and the external apparatus may include: controlling, if there are a plurality of identified users of both the display apparatus and the external apparatus, the content data to be transmitted to and displayed as the content image on the selected one of the display apparatus and the external apparatus based on a user interest of one identified user among the plurality of identified users specified by an event when the event is generated for specifying the one identified user among the plurality of identified users.

In accordance with another exemplary embodiment, there is provided a server including: a communication interface configured to communicate with a plurality of display apparatuses capable of processing content data to be displayed as a content image; and a controller configured to determine whether a user of a first display apparatus among the plurality of display apparatuses is a user of a second display apparatus among the plurality of apparatuses by comparing user identification (ID) information respectively received from the first and second display apparatuses, select a display apparatus between the first and second display apparatus in which a user interest is relatively high, and control transmission of the content data so that content image displayed on the one among the first and second display apparatuses can be displayed on the selected display apparatus.

In accordance with another exemplary embodiment, there is provided a display apparatus including: a display; a communicator configured to communicate with a server; and a controller configured to determine an interest of a user in the display apparatus based on biometric information about the user, control the communicator to transmit the determined interest to the server, and to control the display to display content received from the server.

The display apparatus may further include: a camera configured to capture an image of a face of the user, wherein the controller is configured to determine the interest of the user based on the image of the user's face.

The controller may be further configured to control, in response to the user interest in the display apparatus being relatively lower than an interest of the user in another display apparatus connected to the server, the communicator to transmit content displayed on the display apparatus to the server.

The controller may be further configured to delay the display of the content so that the content may be synchronized with a display of the content on another display apparatus connected to the server.

The controller may be configured to delay the display of the content based on delay information received from the server.

The controller may be configured to delay the display of the content based on a predetermined delay.

BRIEF DESCRIPTION OF THE DRAWINGS

The above and/or other aspects will become apparent and more readily appreciated from the following description of one or more exemplary embodiments, taken in conjunction with the accompanying drawings, in which.

DETAILED DESCRIPTION

Below, one or more exemplary embodiments will be described in detail with reference to accompanying drawings. In the following exemplary embodiments, only elements directly related to the exemplary embodiment will be described, and descriptions about the other elements will be omitted. However, it will be appreciated that the exemplary embodiments may include the elements, the descriptions of which are omitted.

Figure 1:
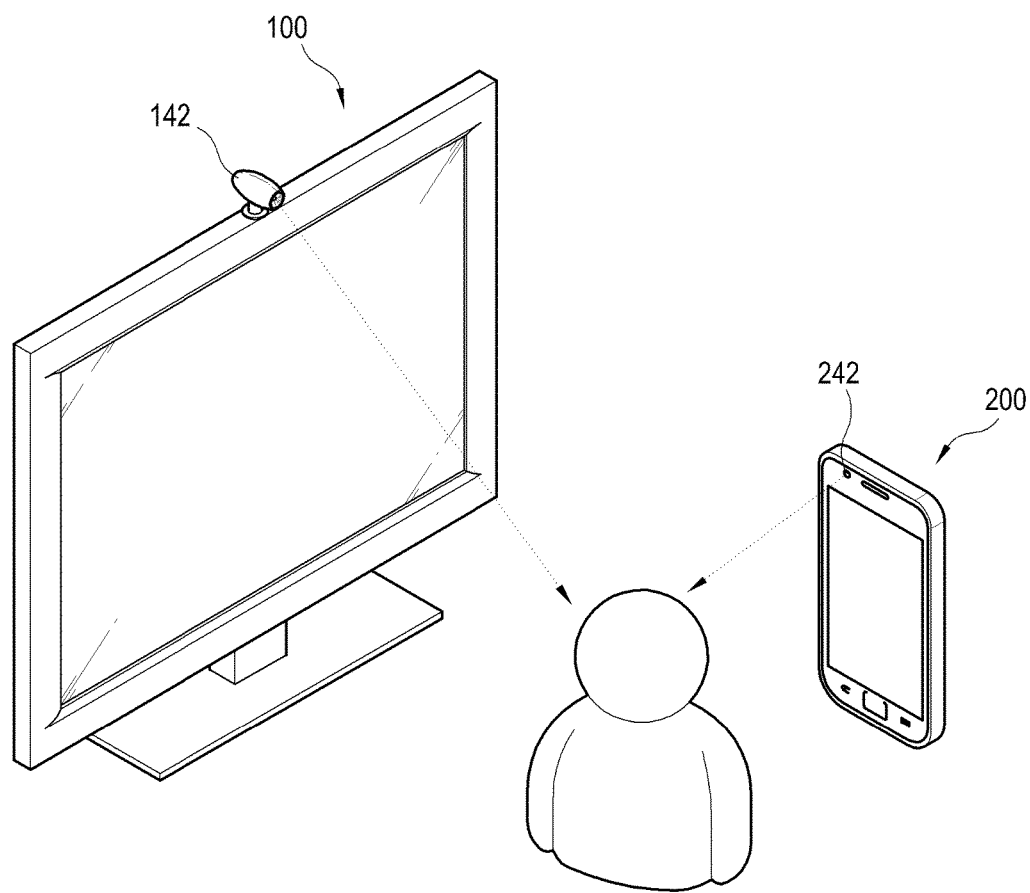
FIG. 1 shows a display system environment according to an exemplary embodiment.

FIG. 1 shows a display system environment according to an exemplary embodiment.

As shown in FIG. 1, a user uses a plurality of display apparatuses 100 and 200. The plurality of display apparatuses 100 and 200 may be achieved in various forms capable of displaying content images. For example, each of the display apparatuses 100 and 200 may be achieved by a TV, a portable multimedia player, a tablet PC, a mobile phone, etc., but this is merely an example. The display apparatuses 100 and 200 may be a same kind of display apparatus or different kinds of display apparatuses. As illustrated, the first display apparatus 100 is a TV, and the second display apparatus 200 is a portable multimedia player. However, this is just an example, and the display apparatuses 100 and 200 may be various kinds of display apparatuses.

The environment or system according to this exemplary embodiment includes two display apparatuses 100 and 200, but this is merely an example. Alternatively, an environment including three or more display apparatuses may also be possible.

In this exemplary embodiment, the display apparatuses 100 and 200 will be respectively called the first display apparatus 100 and the second display apparatus 200 for convenience. However, these terms are just given for convenience. An operation and a structure performed in one of the display apparatuses 100 and 200 may be applied to the other one of the display apparatuses 100 and 200. For example, the operations implemented in the first display apparatus 100 may also or alternatively be implemented in the second display apparatus 200.

A user may view an image displayed on one of the first display apparatus 100 and the second display apparatus 200. The first display apparatus 100 and the second display apparatus 200 respectively include cameras 142 and 242. These cameras 142 and 242 photograph a user. Further, the first display apparatus 100 and the second display apparatus 200 are connected to a communication network so as to communicate with each other.

With this structure, when a user views a certain content image through the second display apparatus 200, s/he may desire to view the content image through not the second display apparatus 200 but the first display apparatus 100. To this end, mirroring, content sharing, or a similar method may be used.

If the mirroring method is used, the second display apparatus 200 connects with the first display apparatus 100 by inputting an internet protocol (IP) address and a password for communication there between, and data of an image is transmitted from the second display apparatus 200 to the first display apparatus 100 so that the image displayed on the second display apparatus 200 can be displayed on the first display apparatus 100.

If the content sharing method is used, a login to a preset account is performed in a sharing-related application executed in the second display apparatus 200, thereby uploading a content to a server (not shown) for sharing the content and allowing the first display apparatus 100 to receive and reproduce the content from the server (not shown).

The foregoing methods eliminate the need for a user to directly transfer content data from the second display apparatus 200 to the first display apparatus 100 through a physical storage medium such as a universal serial bus (USB) memory. However, these methods still require a user to directly input controls for connection between the first display apparatus 100 and the second display apparatus 200, uploading the content to the server (not shown), etc.

Thus, an exemplary embodiment proposes a structure or method for allowing a user to view a content image of the first display apparatus 100 through the second display apparatus 200 or a content image of the second display apparatus 200 through the first display apparatus 200, while reducing a user's input to the first display apparatus 100 or the second display apparatus 200. This will be described later.

Below, the structures of the first display apparatus 100 and the second display apparatus 200 will be described with reference to FIG. 2.

Figure 2:
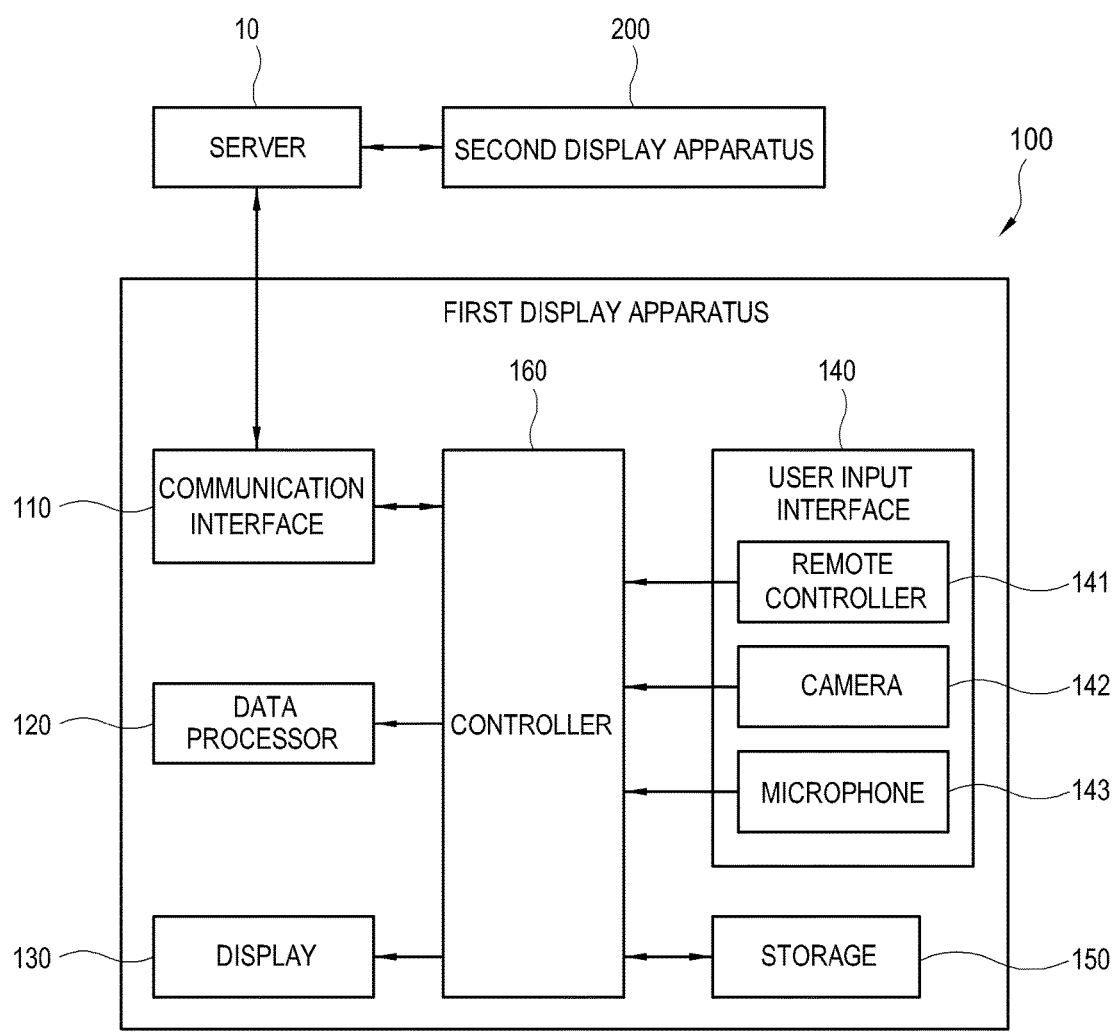
FIG. 2 is a block diagram of a first display apparatus in FIG. 1 according to an exemplary embodiment.

FIG. 2 is a block diagram of a first display apparatus in FIG. 1 according to an exemplary embodiment. In the following, the structure of only the first display apparatus 100 will be described. The structure of the first display apparatus 100 is applicable to the second display apparatus 200, and thus detailed descriptions about the second display apparatus 200 will be omitted.

As shown in FIG. 2, the first display apparatus 100 according to this exemplary embodiment includes a communication interface 110 or communicator for communicating data/a signal with exterior devices, a data processor 120 for processing data received by the communication interface 110 in accordance with preset processes, a display 130 for displaying an image based on image data processed by the data processor 120, a user input interface 140 for receiving a user's input, a storage 150 for storing data/information, and a controller 160 for controlling general operations of the first display apparatus 100.

The communication interface 110 transmits data so that the first display apparatus 100 can communicate with the server 10 or the second display apparatus 200. The communication interface 110 connects with the server 10 and the second display apparatus 200 by a wired/wireless wide area/local area network or local connection method.

In FIG. 2, the communication interface 110 connects with the second display apparatus 200 via the server 10, but this is merely an example. Alternatively, the communication interface 110 may directly connect with the second display apparatus 200, without connecting through the server 10, in accordance with different communication protocols.

The communication interface 110 may be achieved by a connection port corresponding to each device, or an assembly of connection modules. The kind or type of connection protocol or connection target is not limited to those described.

In the communication interface 110, a signal is transmitted and received in accordance with protocols designated to respective connected devices. Thus, a signal can be transmitted and received based on an individual connection protocol with regard to each connected device. In the case of image data, the communication interface 110 may transmit and receive a signal based on radio frequency (RF), composite video, component video, super video, Syndicat des Constructeurs d'Appareils Radiorécepteurs et Téléviseurs (SCART), high definition multimedia interface (HDMI), display port, unified display interface (UDI), wireless HD, and similar standards, as non-limiting examples.

The data processor 120 performs a process set for properties of data/a signal, with regard to the data/signal received in the communication interface 110. If content image data is received in the communication interface 110, the data processor 120 performs an image processing process with regard to the image data and outputs the processed image data to the display 130, thereby making the display 130 display the content image based on the image data. If the communication interface 110 receives a broadcast signal from a certain channel, the data processor 120 extracts image, voice, and appendix data from the broadcast signal and adjusts the image to have a preset resolution, and the display 130 displays the image.

The signal processor 920 may perform various kinds of image processing. As non-limiting examples, the image processing processes may include decoding corresponding to an image format of the image data, de-interlacing an image by converting interlaced image data into progressive image data, scaling by adjusting the image data to have a preset resolution, noise reduction to improve image quality, detail enhancement, frame refresh rate conversion, etc.

The data processor 120 can perform various processes in accordance with the kinds and properties of data to be processed, and therefore the process performable by the data processor 120 is not limited to the image processing process. Further, data to be processed by the data processor 120 is not limited to the data received in the communication interface 110. For example, the data processor 120 may process a user's voice in accordance with a voice processing process when the user input interface 140 senses the user's voice, and perform various processes in accordance with a gesture processing process when the user input interface 140 senses that the user makes a gesture.

The data processor 120 may be achieved by a system-on-chip (SOC) (not shown) where various functions are integrated, or an image processing board (not shown) where individual chipsets for independently performing each process are mounted onto a printed circuit board, and is internally provided in the first display apparatus 100.

The display 130 displays an image based on an image signal/image data processed and output by the data processor 120. The display 130 may be achieved by various types of displays such as, as non-limiting examples, liquid crystal, plasma, light-emitting diode, organic light-emitting diode, surface-conduction electron-emitter, carbon nano-tube, nano-crystal, etc.

The display 130 may include additional elements in accordance with its type. For example, if the display 130 employs a panel structure of the liquid crystal, the display 130 includes a liquid crystal display (LCD) panel (not shown), a backlight unit (not shown) emitting light to the LCD panel, and a panel driving substrate (not shown) for driving the LCD panel.

The user input interface 140 transmits various control commands or information to the controller 160 in accordance with a user's control or input. The user input interface 140 responds to various events generated by a user and transmits the command or information to the controller 160. The event generated by a user may be given in various forms, and may, for example, include a user's control, speech, or gesture.

The user input interface 140 transfers a user's command to the controller 160 so that the controller 160 can perform operations in accordance with the user command. Thus, in accordance with a manner by which a user may input information, the user input interface 140 is configured to sense information input in such a manner. That is, the user input interface 140 is achieved by an assembly of interfaces respectively corresponding to various input manners of a user. For example, the user input interface 140 includes a remote controller 141 separated from the first display apparatus 100, a camera 142, a microphone 143, etc.

The storage 150 stores a variety of data. The storage 150 is achieved by a nonvolatile memory, such as a flash memory, a hard disk drive, or the like, to preserve data regardless of whether system power is on or off. The storage 150 is accessed by the controller 160 to read, record, modify, delete and update the stored data. The data may be previously stored in the storage 150.

The controller 160 is achieved by a central processing unit (CPU), and controls operations of general elements such as the data processor 120 of the first display apparatus 100 in response to a predetermined event. As a non-limiting example, when the communication interface 110 receives the image data of predetermined contents, the controller 160 controls the data processor 120 so that the image data can be displayed as an image on the display 130. Further, the controller 160 controls the other elements of the display apparatus 100, such as the data processor 120, to perform operations in response to a user's input received through the user input interface 140.

Although it is not depicted in the accompanying drawings, the server 10 includes a server-communication interface (not shown) for communicating with the display apparatuses 100 and 200, and a server-controller (not shown) for controlling and executing general operations of the server 10.

Below, more detailed configurations of the data processor 120 according to an exemplary embodiment will be described with reference to FIG. 3.

Figure 3:
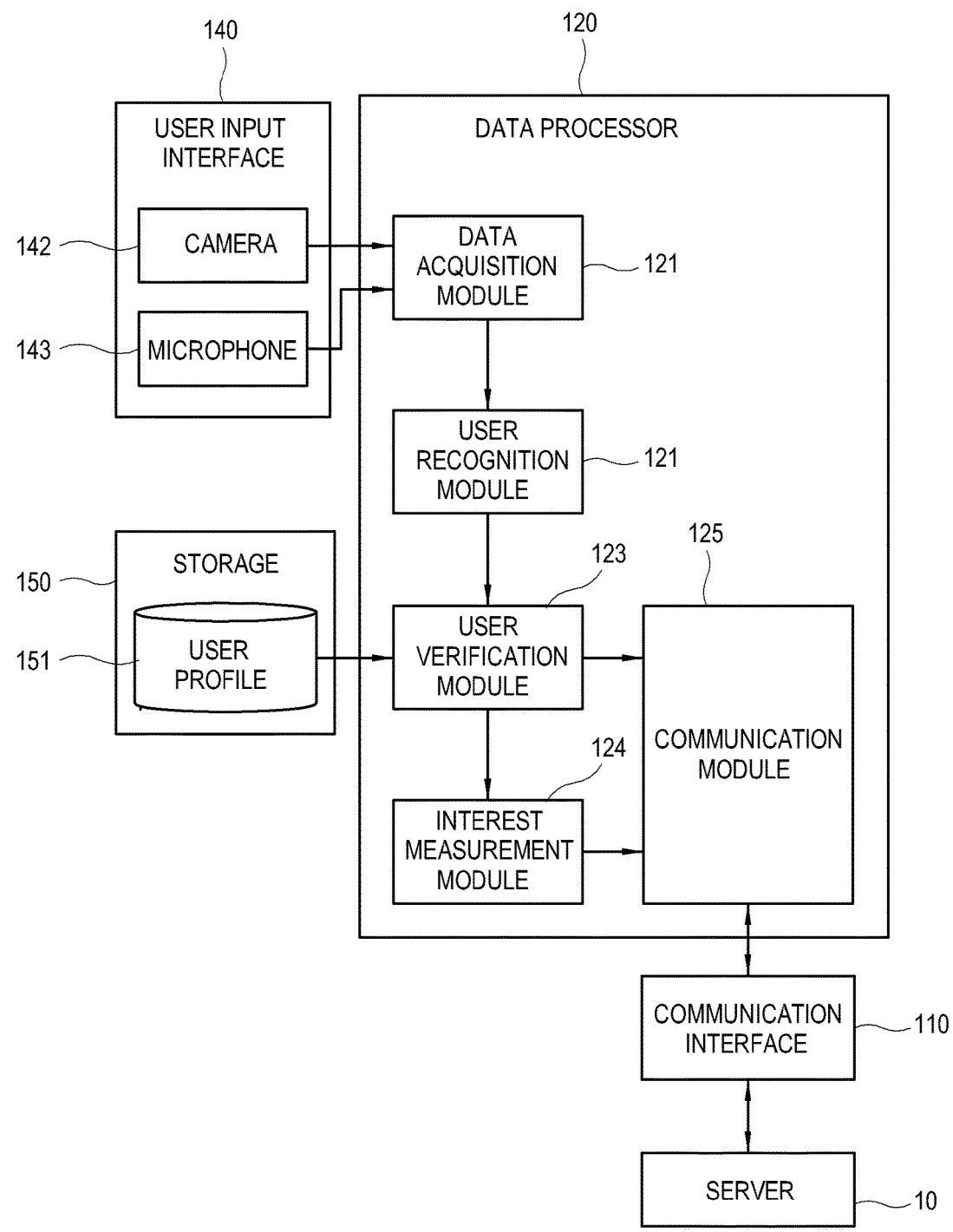
FIG. 3 is a block diagram of a data processor in the first display apparatus of FIG. 2 according to an exemplary embodiment.

FIG. 3 is a block diagram of the data processor 120 according to an exemplary embodiment.

As shown in FIG. 3, the data processor 120 includes a data acquisition module 121 for acquiring a user's biometric information from the user input interface 140; a user recognition module 122 for recognizing a user from the biometric information acquired by the data acquisition module 121; a user verification module 123 for searching and authenticating identification (ID) information corresponding to information about a user recognized by the user recognition module 121; an interest measurement module 124 for calculating a user's interest in the first display apparatus 100 based on the information about the user recognized by the user recognition module 122; and a data communication module 125 for controlling the communication interface 110 to transmit information/data from the respective modules 121, 122, 123, and 124 to the server 10 or receive information/data from the server 10.

The data processor 120 was classified into the above block or modules 121, 122, 123, 124, and 125 by their individual functions for convenience. However, the data processor 120 is not limited to this exemplary embodiment. The modules 121, 122, 123, 124, and 125 may be achieved by hardware or may be partially achieved by software. The respective modules 121, 122, 123, 124, and 125 that constitute the data processor 120 may individually perform their operations, or a single processor (not shown) of the data processor 120 may perform all the operations without being classified into the respective modules 121, 122, 123, 124, and 125.

The biometric information refers to information for identifying or verifying a person based on his/her biological or behavioral features. For example, intrinsic feature information previously extracted from one or more persons may be compared with biometric information newly extracted from a specific person, and the feature information may be used for authenticating or verifying the specific person. Further, the feature information may be used for identifying or finding a specific person. The technology related to the biometric information allows such processes to be performed automatically.

In general, the biometric information may include, as non-limiting examples, a fingerprint, an iris, a hand shape, voice recognition, of a digital image, etc. Both government and private enterprises have shown interest in technology related to the biometric information since biometric information is more difficult to forge than other identification documents, cards, etc. A biometric information recognition system has been used in access control for secure places, such as nuclear facilities, banks, etc., as well as in police stations, vending machines, government agencies, etc.

An example of the biometric information, there is deoxyribonucleic acid (DNA). If DNA is used, a comparison and search are finished within a short time even with a massive database. Currently, several nations have built a national DNA database, in which DNA samples for building the DNA database are extracted and collected through predetermined procedures with regard to various groups of persons.

Below, the respective modules 121, 122, 123, 124, and 125 will be described in greater detail.

The data acquisition module 121 acquires a user's biometric information transferred through the user input interface 140. A user's biometric information refers to information showing his/her biological features for identifying the user. The biometric information may be, for example, information determined from an image of a user captured by the camera 142, a user's voice information received through the microphone 143, etc.

In this exemplary embodiment, the data acquisition module 121 employs the camera 142 to acquire a user's image information, but this is merely an example. Alternatively, the data acquisition module 121 may acquire a user's voice information through the microphone 143, or may acquire both a user's image information and voice information.

The user recognition module 122 draws a feature value for identifying a user based on the biometric information received from the data acquisition module 121. For example, the user recognition module 122 draws a feature vector for identifying a user by analyzing a user's image information, and, in particular, draws a feature vector of a user's face within an image of the user. The user recognition module 122 may use various algorithms depending on designs as a method for drawing a feature value based on a user's biometric information, but exemplary embodiments are not limited to a specific method.

The user verification module 123 identifies and verifies a user based on his/her feature values drawn by the user recognition module 122. Specifically, the user verification module 123 retrieves a user ID corresponding to the feature vector drawn from his/her image information from a user profile 151 previously stored in the storage 150. The user profile 151 includes one or more user IDs and feature vectors corresponding to each user ID. If the ID corresponding to the feature vector is retrieved from the user profile 151, the user verification module 123 performs a login with the retrieved ID, thereby identifying and verifying the user.

The user ID stored in the user profile 151 and the feature vector corresponding to the user ID may be previously set by a user. The display apparatus 100 provides a UI environment for allowing a user to designate his/her ID. Through the provided UI environment, a user can designate his/her ID and input biometric information corresponding to the designated ID. Thus, biometric information input to the display apparatus 100 is used as reference biometric information corresponding to the designated ID, converted into a feature vector, and then registered to the user profile 151.

The user verification module 123 selects the reference biometric information determined to be the same as the acquired biometric information, and verifies the user ID corresponding to the selected reference biometric information, thereby identifying a user. Here, the sameness means that identity or similarity between both pieces of information is within a preset error range.

When the user verification module 123 verifies a user, the interest measurement module 124 measures his/her immersion or interest in the first display apparatus 100. The immersion or interest refers to a parameter obtained by quantifying and numerically quantizing how much a user is immersed or interested in the first display apparatus 100. The interest measurement module 124 calculates a user's interest based on his/her feature vector drawn by the user recognition module 122.

The interest measurement module 124 may employ various methods to measure a user's interest, details of which will be described later.

The data communication module 125 transmits data processed by the data processor 120 to the communication interface 110 so that the data can be transmitted to the server 10. In addition, the data communication module 125 may receive data received by the communication interface 110.

According to an exemplary embodiment, the data communication module 125 transmits the ID verified by the user verification module 123 to the server 10, and also transmits the user's interest measured by the interest measurement module 124 to the server 10, details of which will be described later.

Below, a method of measuring a user's interest through the interest measurement module 124 will be described with reference to FIG. 4.

Figure 4:
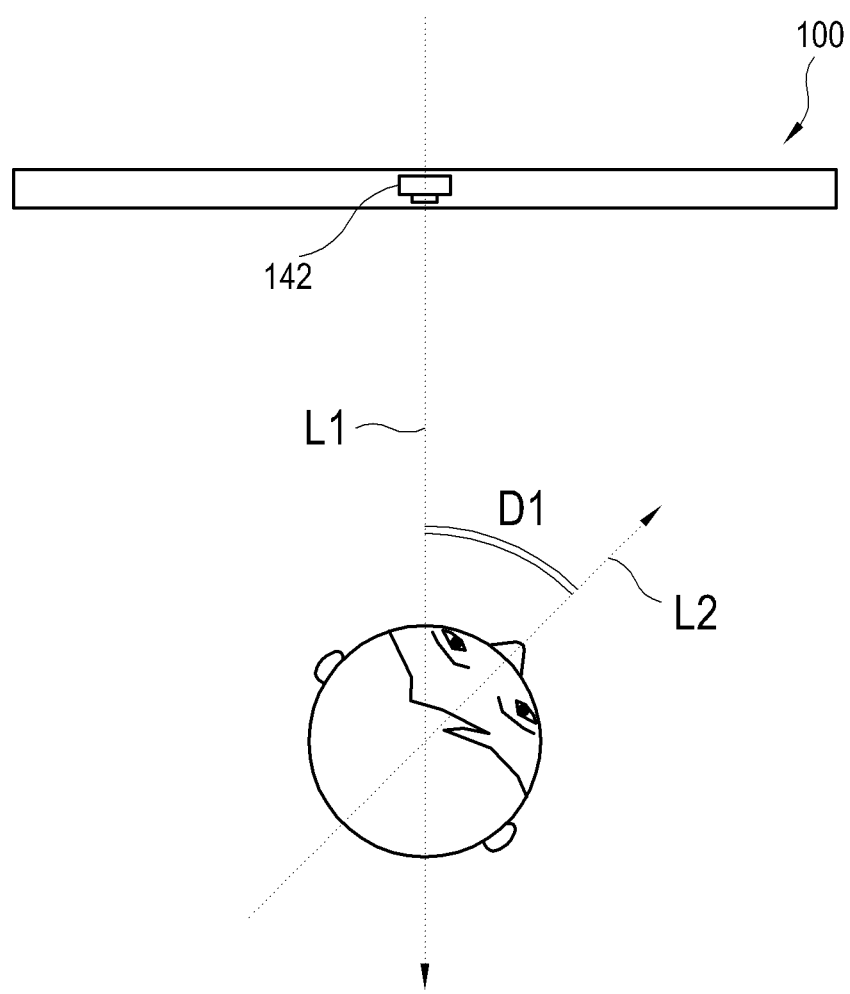
FIG. 4 shows an example of measuring a value of a user interest in the first display apparatus of FIG. 2 according to an exemplary embodiment.

FIG. 4 shows an example of measuring a value of a user's interest in the first display apparatus 100 according to an exemplary embodiment.

As shown in FIG. 4, a user's interest is calculated by quantifying and numerically quantizing a user's one or more operation states such as a position or posture of his/her face, a direction of his/her pupil, etc. In this exemplary embodiment, a user's interest is calculated from one operation state. However, if a user's interest is calculated from a plurality of operation states, a value of interest in each operation state may be calculated and combined by a preset function, thereby obtaining a final numerical value.

In the case that the position of a user's face is selected as the operation state, the highest interest is determined when his/her face is frontward directed to the first display apparatus 100. In this regard, an angle D1 of an axial line L2, toward which a user's face is directed, to a straight line L1 connecting the camera 142 and a user's face may correspond to a value of interest.

In this case, if the angle D1 is 0, it is determined that a user's interest in the first display apparatus 100 is very high. As the angle D1 increases, it is determined that a user's interest in the first display apparatus 100 decreases.

A similar principle may be applied to a case where the direction of a user's pupil is selected as the operation state, i.e. the interest is high when a user's pupil is directed toward the first display apparatus 100. An angle between an axial line, toward which a user's pupil is directed, and an axial line in a front direction of the first display apparatus 100 may be designated as a value of interest. The smaller this angle, the higher a user's interest. The greater this angle, the lower a user's interest.

In such a manner, the interest measurement module 124 (see FIG. 3) measures a user's interest in the first display apparatus 100. However, the foregoing methods of measuring the interest are just examples. Alternatively, the interest may be measured by various other methods.

Since the foregoing measured interests are quantified and numerically-quantized values, it is possible to compare two or more interests. For instance, if a first case where the angle D1 is 30 degrees is compared with a second case where the angle D1 is 40 degrees, the first case has a smaller angle than the second case. Thus, it is determined that the first case shows a higher interest than the second case.

Under the display system environment with the foregoing structure, a content image is displayed on one of the first display apparatus 100 and the second display apparatus 200 in accordance with a user interest in each of the first display apparatus 100 and the second display apparatus 200. This will be described with reference to FIG. 5.

Figure 5:
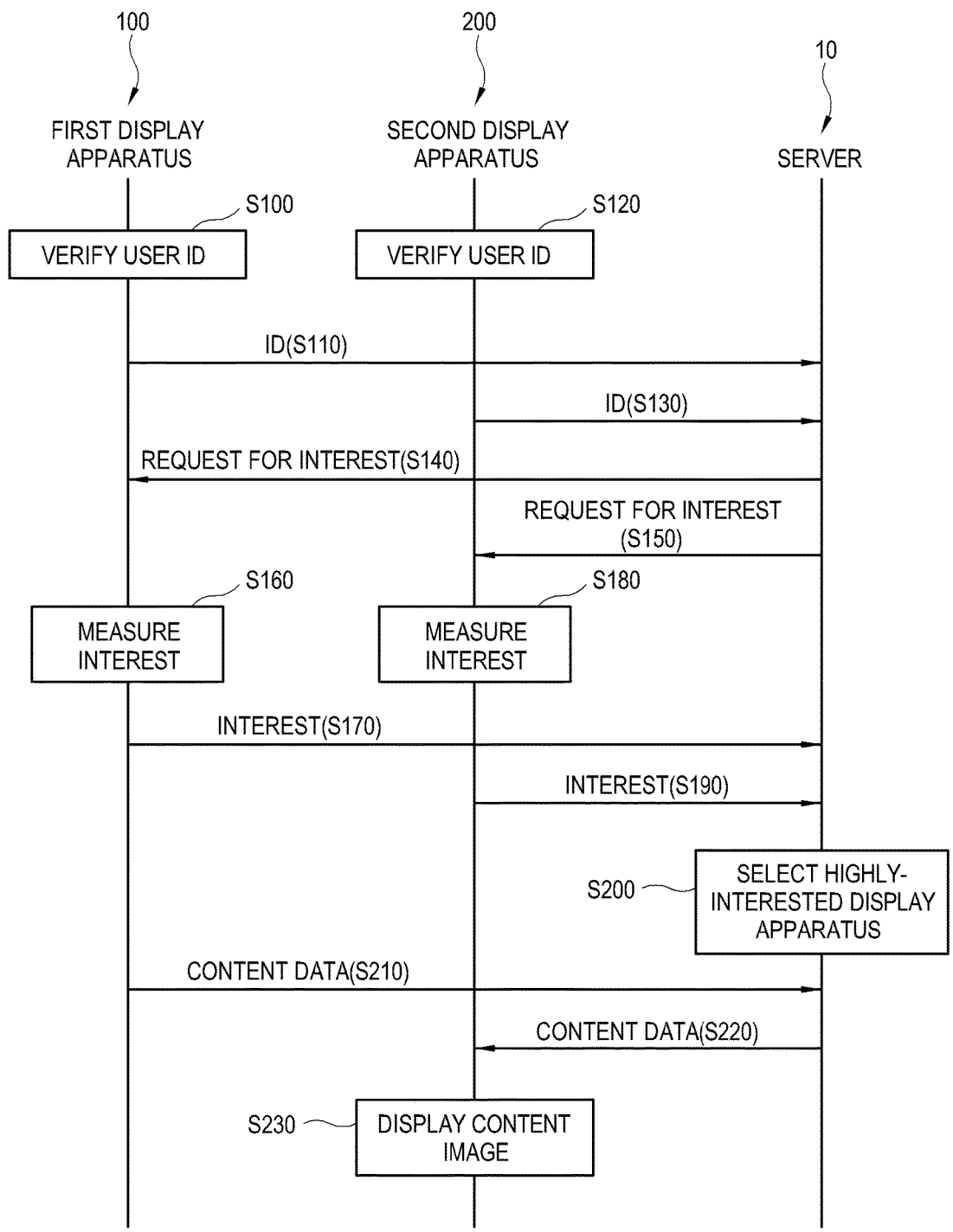
FIG. 5 shows an example of data transmission among the first display apparatus, a second display apparatus, and the server of FIG. 2 according to an exemplary embodiment.

FIG. 5 shows an example of data transmission among the first display apparatus 100, the second display apparatus 200 and the server 10. In this exemplary embodiment, the first display apparatus 100 initially displays a content image.

As shown in FIG. 5, at operation 5100 the first display apparatus 100 acquires a user's image information, and verifies a user ID corresponding to the acquired image information, thereby identifying a user. At operation 5110, the first display apparatus 100 transmits the verified ID to the server 10.

At operation 5120, the second display apparatus 200 also acquires a user's image information, and verifies a user ID corresponding to the acquired image information, thereby identifying a user. At operation 5130, the second display apparatus 200 transmits the verified ID to the server 10.

The server 10 compares the ID received from the first display apparatus 100 and the ID received from the second display apparatus 200. If the server 10 determines that the two IDs are the same, i.e. that the user of the first display apparatus 100 is also the user of the second display apparatus 200, the following content sharing process begins.

At operations 5140 and 5150, the server 10 requests the user's interests from the first display apparatus 100 and the second display apparatus 200, respectively.

The first display apparatus 100 measures the user's interest at operation 5160, and transmits the measured interest to the server 10 at operation 5170. Likewise, the second display apparatus 200 measures the user's interest at operation 5180, and transmits the measured interest to the server 10 at operation 5190.

At operation 5200, the server 10 compares the interest measured by the first display apparatus 100 and the interest measured by the second display apparatus 200, and selects, between the first display apparatus 100 and the second display apparatus 200, a display apparatus in which a user shows relatively high interest.

For example, if the user's interest in the second display apparatus 200 is higher than the user's interest in the first display apparatus 100, the server 10 receives content data from the first display apparatus 100 where a content image is currently displayed, at operation S210. Further, the server 10 transmits the content data to the second display apparatus 200 at operation 5220. The operation S210 in which the server 10 receives the content data from the first display apparatus 100 may be performed at a point of time when the content sharing process starts.

At operation 5230, the second display apparatus 200 processes the content data and displays the content image. While the second display apparatus 200 displays the content image, the first display apparatus 100 may continue displaying the content image or may not continue displaying the content image. These operations may be performed as the server 10 transmits control commands to the display apparatuses 100 and 200 during operation 5200.

With these operations, the content image can be displayed on the display apparatus in which the user shows higher interest, between the first display apparatus 100 and the second display apparatus 200.

In the operation 5200, if it is determined that the user's interest in the first display apparatus 100 is higher than the user's interest in the second display apparatus 200, the server 10 make the content image, which is currently displayed on the first display apparatus 100, to continue to be displayed by the first display apparatus 100.

In this case, the server 10 may receive the content data from the first display apparatus 100, and transmits the received content data back to the first display apparatus 100 so that the first display apparatus 100 can process the retransmitted content data and display the content image. This allows synchronization of the content data processed and displayed by the first display apparatus 100 and the content data processed and displayed by the second display apparatus 200. In this case, the server 10 receives the content data from the first display apparatus 100, and transmits the content data to the display apparatus 100 or 200 specified by determination results of the user's interest.

Instead of receiving the content data from the first display apparatus 100 and transmitting the content data again to the first display apparatus 100, the first display apparatus 100 may use a preset time delay to process the content data so as to synchronize the timings of displaying the image. Alternatively, a time delay may be provided to the first display apparatus 100 by the server 10 or the second display apparatus 200.

In the operation 5200, if it is determined that the user's interest in the first display apparatus 100 and the user's interest in the second display apparatus 200 are both higher or lower than a preset value, the server 10 may make the content image continue to be displayed on the first display apparatus 100.

In the foregoing exemplary embodiment, when the content data is received or stored in the first display apparatus 100, the server 10 receives the content data from the first display apparatus 100. However, this is merely an example, and the content data may be received using various methods, and additional examples will be described below.

Figure 6:
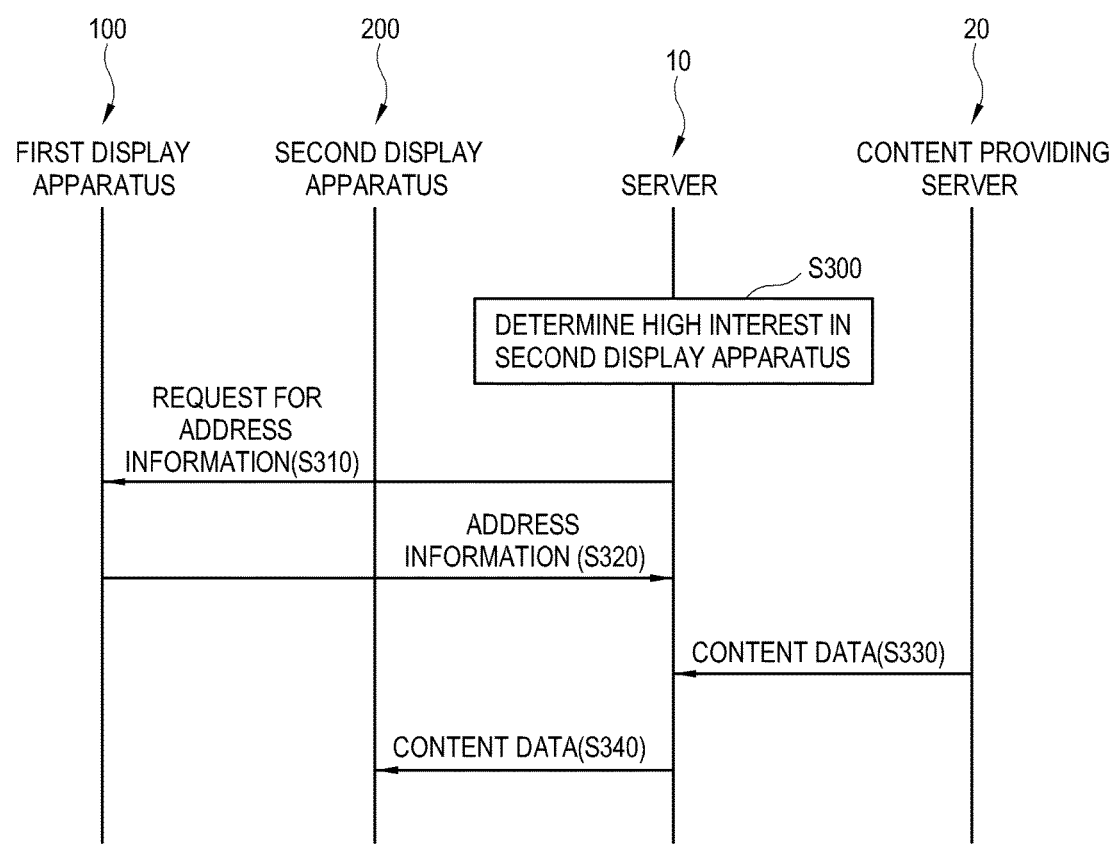
FIG. 6 shows an example of data transmission, in which a server of FIG. 2 controls content data to be received in the second display apparatus according to an exemplary embodiment.

FIG. 6 shows an example of data transmission, in which the server 10 controls content data to be received in the second display apparatus 200. In this exemplary embodiment, the content data is initially received by the first display apparatus 100. Operations of this exemplary embodiment are performed after the operations 5100 to 5200 shown in FIG. 5.

As shown in FIG. 6, at operation 5300 the server 10 determines that the user's interest in the second display apparatus 200 is high relative to the user's interest in the first display apparatus 100. If the first display apparatus 100 receives content data from a separate content providing server 20, the server 10 makes a request for address information of the content data to the first display apparatus 100 at operation 5310 and receives the address information from the first display apparatus 100 at operation 5320.

The server 10 receives the content data in accordance with the address information at operation 5330, and transmits the content data to the second display apparatus 200 at operation 5340.

Alternatively, the server 10 may transmit the address information for receiving the content data to the second display apparatus 200 at a point of time corresponding to the operation 5330. In this case, the second display apparatus 200 receives the content data in accordance with the address information received from the server 10.

Thus, various methods may be used for providing the content data to the second display apparatus 200.

Below, a method of controlling the first display apparatus 100 according to an exemplary embodiment will be described with reference to FIG. 7.

Figure 7:
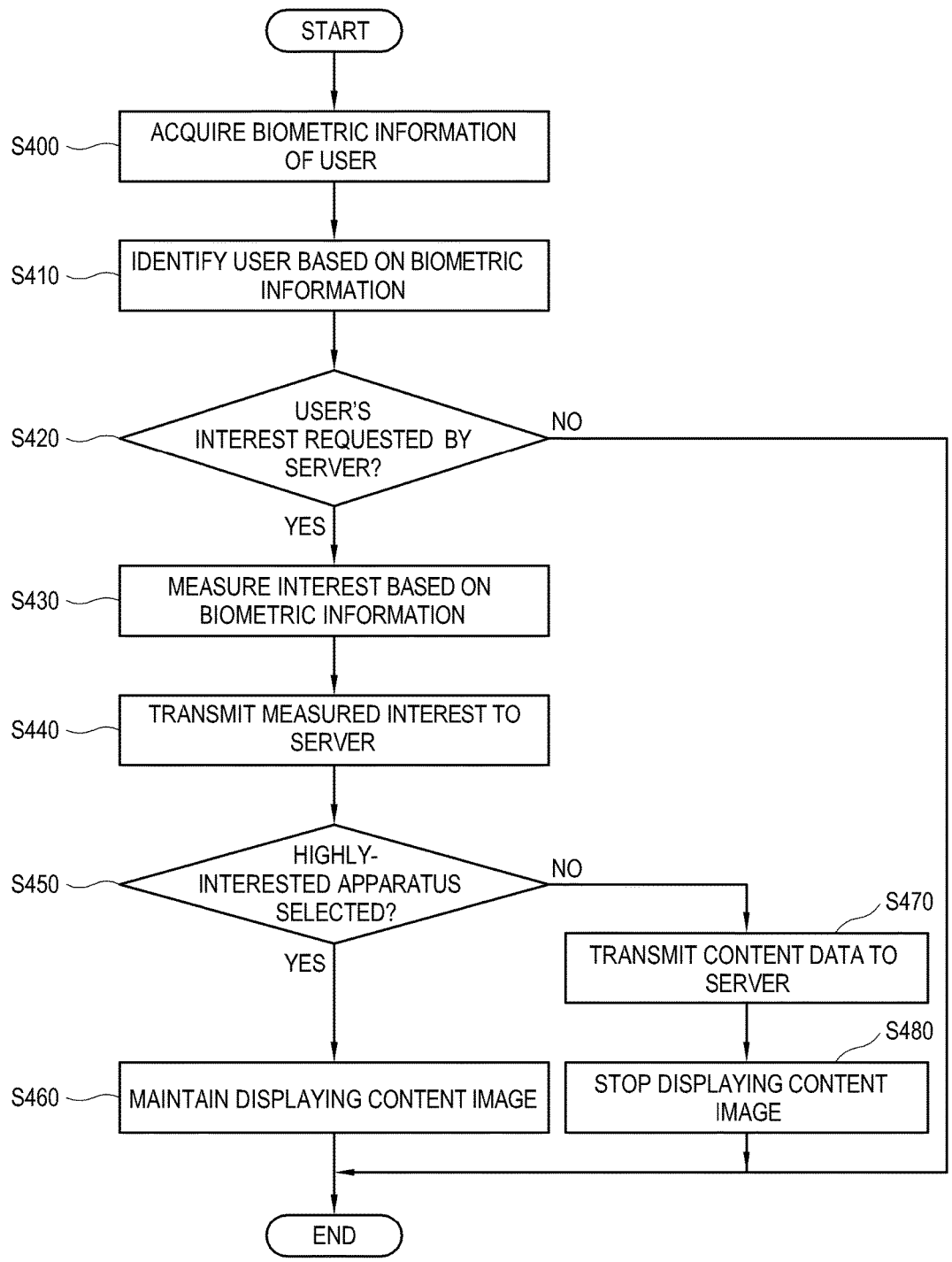
FIG. 7 is a flowchart showing a method of controlling a first display apparatus of FIG. 2 according to an exemplary embodiment.

FIG. 7 is a flowchart showing a method of controlling the first display apparatus 100. In this exemplary embodiment, the first display apparatus 100 is initially receiving and displaying the content image.

As shown in FIG. 7, the first display apparatus 100 acquires a user's biometric information at operation 5400, and identifies a user based on the acquired biometric information at operation 5410.

If the server 10 makes a request for the user's interest to the first display apparatus 100 at operation 5420, the user's interest in the first display apparatus 100 is measured based on image information from among pieces of a user's biometric information at operation S430. Then, the first display apparatus 100 transmits a user's interest to the server 10 at operation 5440.

In the above operations, a user's image information is used as the biometric information for identifying a user, but this is merely an example. Alternatively, a user's voice information may be used. However, in this exemplary embodiment, a user's image information is more suitable for measuring a user's interest than a user's voice information, and therefore the biometric information acquired in the operation 5400 includes a user's image information.

Alternatively, the first display apparatus 100 may identify a user based on a user's voice information in the operation 5410, and then acquire the user's image information in response to the request from the server 10 for the user's interest in the operation 5420.

If the first display apparatus 100 is selected as a highly interested apparatus by the server 10 at operation 5450, the first display apparatus 100 maintains displaying the content image at operation 5460. On the other hand, if the first display apparatus 100 is not selected as a highly interested apparatus by the server 10 in the operation 5450, the first display apparatus 100 transmits the content data to the server 10 at operation S470 and stops displaying the content image at operation S480.

Below, a method of controlling the server 10 will be described with reference to FIG. 8.

Figure 8:
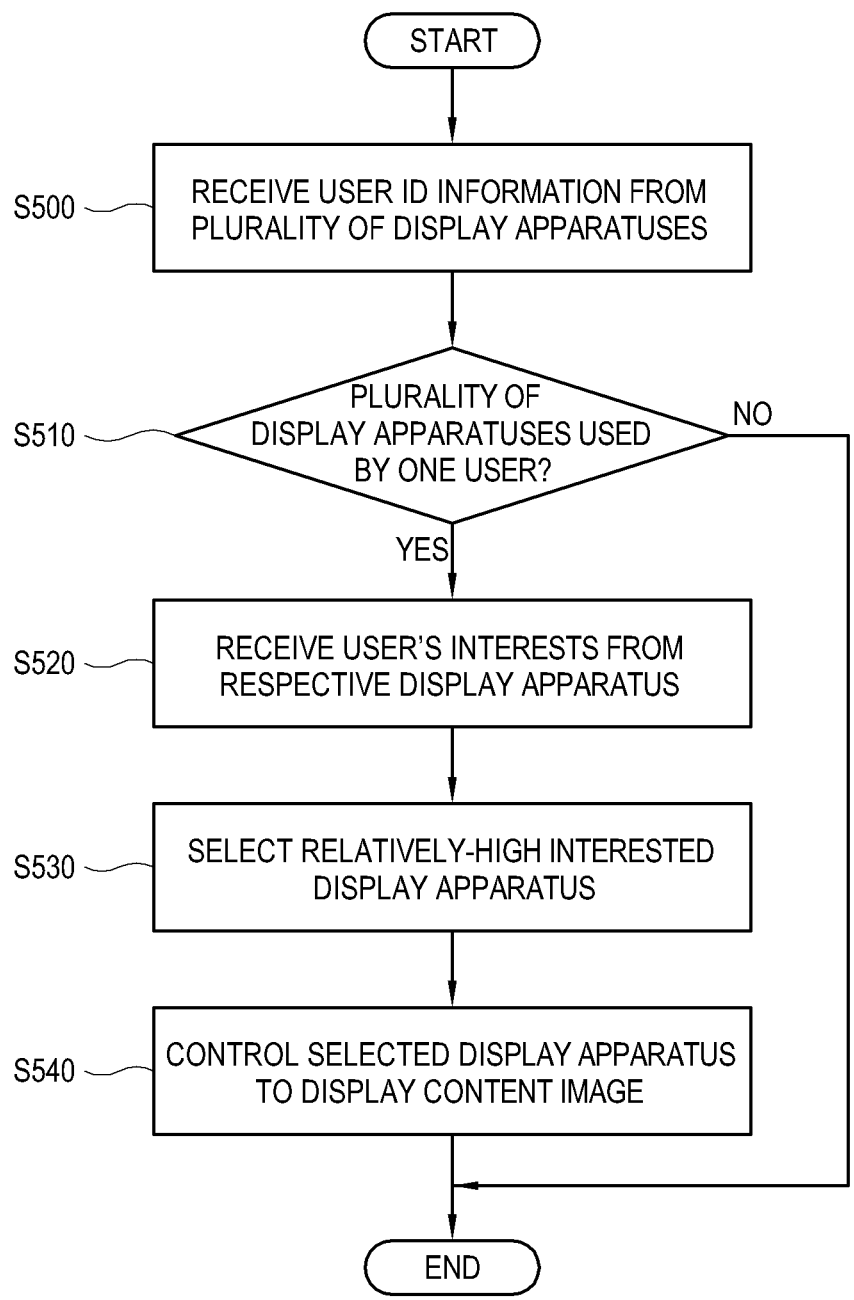
FIG. 8 is a flowchart showing a method of controlling a server of FIG. 2 according to an exemplary embodiment.

FIG. 8 is a flowchart showing a method of controlling the server 10 according to an exemplary embodiment.

As shown in FIG. 8, the server 10 receives user identification information from a plurality of display apparatuses 100 and 200 at operation 5500. The server 10 compares the pieces of identification information respectively received from the display apparatuses 100 and 200 and determines whether a same user uses the plurality of display apparatuses 100 and 200, at operation 5510.

If it is determined that the same user uses the plurality of display apparatuses 100 and 200, the server 10 receives a user's interests from the respective display apparatuses 100 and 200. The server 10 compares the interests from the respective display apparatuses 100 and 200, and selects the display apparatus in which a user shows relatively high interest, from among the plurality of display apparatuses 100 and 200 at operation 5530.

At operation 5540, the server 10 controls the selected display apparatus 100 or 200 to display the content image.

In the foregoing exemplary embodiment, one user is recognized by both the first display apparatus 100 and the second display apparatus 200. On the other hand, if a plurality of users are recognized by the first display apparatus 100 and the second display apparatus 200, the server 10 does not implement the content sharing process. However, if a user among the plurality of users is specified in accordance with a certain event, the server 10 may implement the content sharing process with respect to the specified user. This will be described below with reference to FIG. 9.

Figure 9:
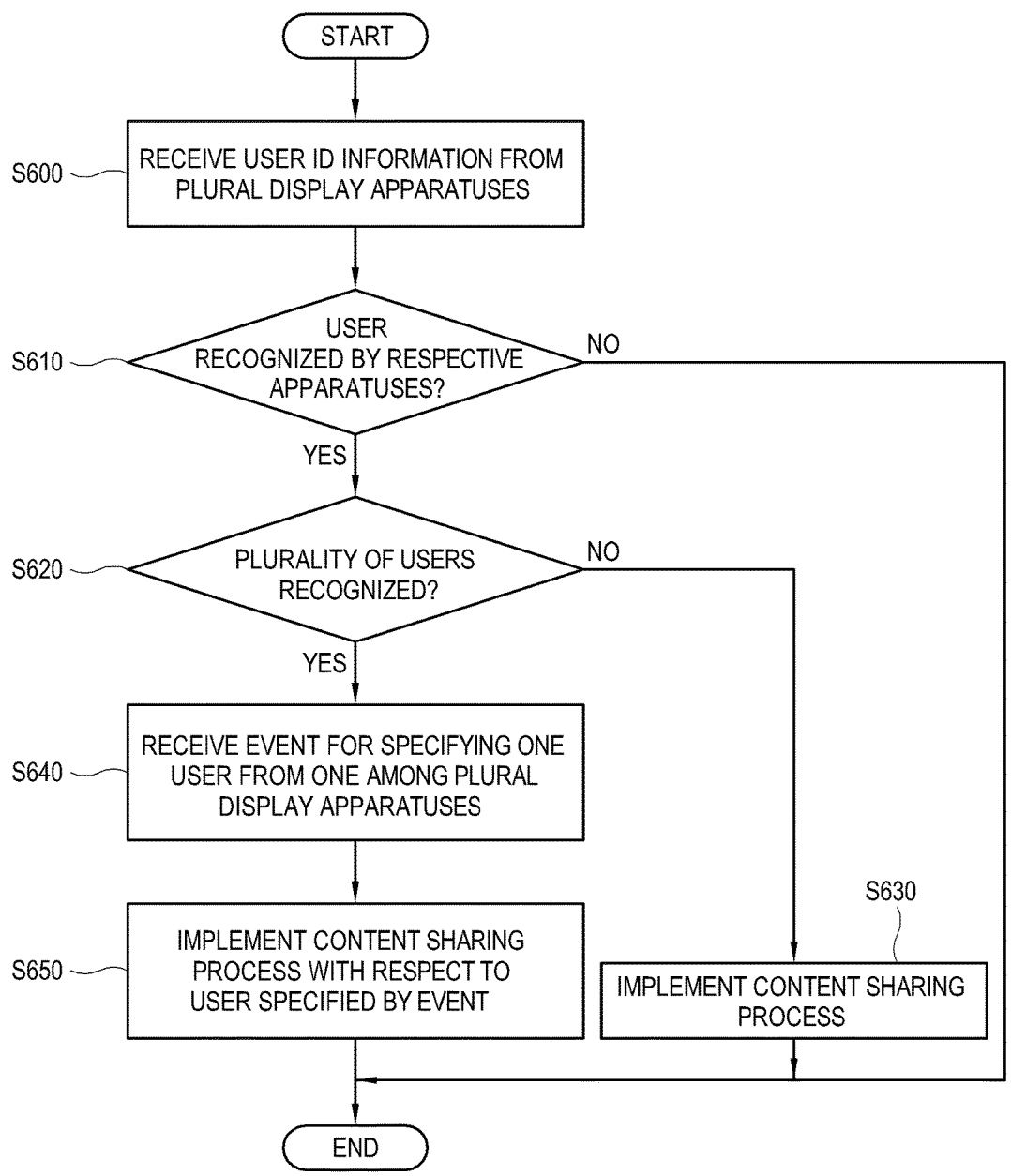
FIG. 9 is a flowchart showing a method of controlling a server according to another exemplary embodiment.

FIG. 9 is a flowchart showing a method of controlling the server 10 according to another exemplary embodiment.

As shown in FIG. 9, the server 10 receives pieces of user identification information from the plurality of display apparatuses 100 and 200 at operation S600, respectively. At operation 5610, the server 10 determines whether there is a user recognized by the plurality of display apparatuses 100 and 200.

If there is a recognized user, the server 10 determines whether there are a plurality of users recognized by both the display apparatus 100 and the display apparatus 200, at operation 5620. If it is determined that there is only one recognized user, the server 10 implements the foregoing content sharing process at operation 5630.

On the other hand, if it is determined that there are a plurality of recognized users, the server 10 receives an event for specifying one user among the plurality of recognized users from one among the plurality of display apparatuses 100 and 200 at operation 5640. This event may be generated in various forms. For example, one user may input speech corresponding to a preset command to the microphone (not shown) of one display apparatus 100 or 200.

As the event is generated, the server 10 implements the content sharing process with respect to the user specified by the event at operation 5650. The content sharing process for one user has already been described in the foregoing exemplary embodiment, and thus repetitive descriptions will be avoided.

In the foregoing exemplary embodiments, the server 10 is configured to control the content sharing process, but this is merely exemplary. If direct communication is enabled between the first display apparatus 100 and the second display apparatus 200, one of the first display apparatus 100 and the second display apparatus 200 may provide the functions of the server 10 and there is no need for the server 10. This will be described with reference to FIG. 10.

Figure 10:
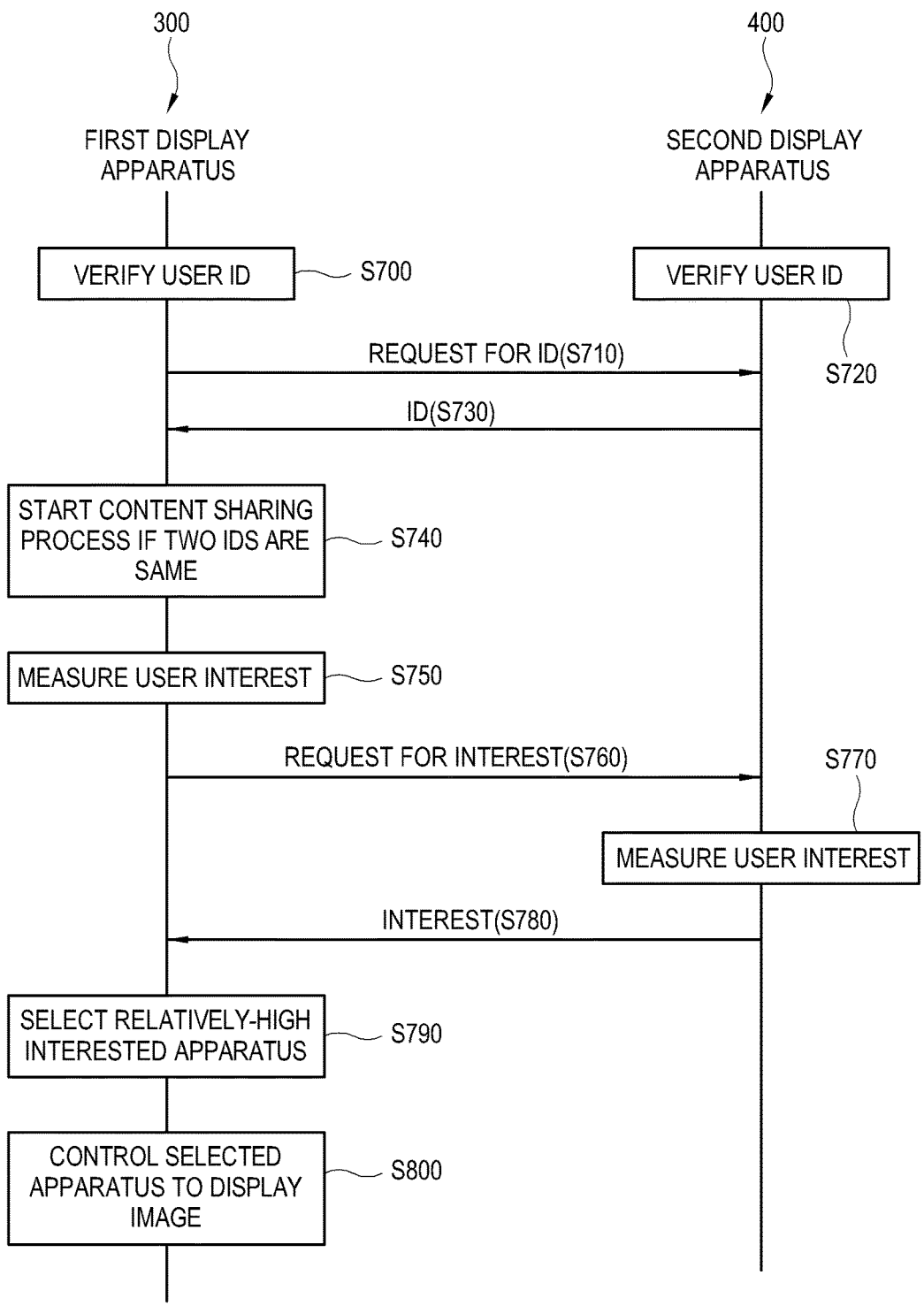
FIG. 10 shows an example of data transmission between a first display apparatus and a second display apparatus according to another exemplary embodiment.

FIG. 10 shows an example of data transmission between a first display apparatus 300 and a second display apparatus 400 according to another exemplary embodiment.

As shown in FIG. 10, at operation 5700, the first display apparatus 300 acquires a user's image information, and verifies user ID corresponding to the acquired image information, thereby identifying a user. At operation 5710, the first display apparatus 300 makes a request for the user ID to the second display apparatus 400.

At operation 5720, the second display apparatus 400 acquires a user's image information and verifies a user ID corresponding to the acquired image information, thereby identifying a user. At operation 5730, the second display apparatus 400 transmits the verified ID to the first display apparatus 300.

The first display apparatus 300 compares the ID verified by itself and the ID received from the second display apparatus 400. At operation 5740, the first display apparatus 300 starts the content sharing process if it is determined that two IDs are the same.

The first display apparatus 300 measures a user's interest in the first display apparatus 300 at operation 5750, and makes a request for a user's interest in the second display apparatus 400 to the second display apparatus 400 at operation 5760.

The second display apparatus 400 measures a user's interest in the second display apparatus 400 at operation 5770, and transmits the measured interest to the first display apparatus 300 at operation 5780.

At operation 5790, the first display apparatus 300 compares the two interests, and selects a display apparatus in which a user shows a relatively high interest, between the first display apparatus 300 and the second display apparatus 400. At operation 5800, the first display apparatus 300 controls the selected display apparatus 300 or 400 to display a content image.

As described above, an exemplary embodiment can be achieved by direct communication between the display apparatuses 300 and 400 without the server 10.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display;
   a data processor configured to process content data to be displayed as a content image on the display;
   a user input interface configured to receive biometric information about a user;
   a communication interface configured to communicate with an external apparatus; and
   a controller configured to identify the user based on the biometric information received through the user input interface, and automatically control, if it is determined that the identified user is also a user of an external apparatus, the content data to be displayed as the content image on one of the display apparatus and the external apparatus in which a user interest is relatively high,
   wherein the user interest is determined based on an image of the user, and
   wherein, when the display apparatus and the external apparatus are currently displaying the content image and another content image, respectively, and if it is determined that the user interest in the display apparatus and the user interest in the external apparatus are both higher than a preset first value or both lower than a preset second value, the controller is further configured to control each of the display apparatus and the external apparatus to continue displaying the content image and the another content image, respectively.

2. The display apparatus according to claim 1, wherein the interest in the display apparatus is calculated based on at least one of a position of the user's face and a direction of the user's pupil with respect to the display apparatus in the image of the user.

3. The display apparatus according to claim 2, wherein the user input interface comprises a camera configured to capture an image of the user's face, and
   wherein the controller is further configured to determine a user interest in the display apparatus based on an angle between an axial line, toward which the user's face is directed, and a straight line connecting the camera and the user's face.

4. The display apparatus according to claim 3, wherein the controller is further configured to determine that the user interest in the display apparatus is high when the angle approximates 0, and that the interest in the display apparatus decreases as the angle increases.

5. The display apparatus according to claim 1, wherein, if it is determined that a user interest in the external apparatus is relatively high in comparison to the user interest in the display apparatus while the communication interface receives the content data, the controller is further configured to transmit the content data to the external apparatus so that the external apparatus can display the content image.

6. The display apparatus according to claim 1, further comprising a storage configured to store at least one user identification (ID) and reference biometric information corresponding to the ID,
   wherein the controller is further configured to identify the user by selecting the reference biometric information, which corresponds to the biometric information input to the user input interface, among the at least one reference biometric information stored in the storage, and verifying the ID corresponding to the selected reference biometric information.

7. The display apparatus according to claim 6, wherein the user input interface comprises a camera configured to capture an image of the user's face and a microphone configured to receive the user's voice, and
   wherein the controller identifies the user based on at least one of the image of the user's face captured by the camera and the user's voice received by the microphone.

8. The display apparatus according to claim 1, wherein, if there are a plurality of identified users of both the display apparatus and the external apparatus, the controller is further configured to control the content data to be displayed as the content image on one of the display apparatus and the external apparatus based on a user interest of one identified user among the plurality of identified users specified by an event when the event is generated for specifying the one identified user among the plurality of identified users.

9. A method of controlling a display apparatus, the method comprising:
   processing content data to be displayed as a content image;
   communicating with an external apparatus;
   identifying a user based on biometric information received in the display apparatus;
   selecting, if it is determined that the identified user is also a user of an external apparatus, one of the display apparatus and the external apparatus in which a user interest is relatively high; and
   automatically controlling the content data to be transmitted to and displayed as the content image on the selected one of the display apparatus and the external apparatus in which a user interest is relatively high,
   wherein the user interest is determined based on an image of the user and
   wherein the selecting one of the display apparatus and the external apparatus comprises controlling, when the display apparatus and the external apparatus are currently displaying the content image and another content image, respectively, and if it is determined that the user interest in the display apparatus and the user interest in the external apparatus are both higher than a preset first value or both lower than a preset second value, each of the display apparatus and the external apparatus to continue displaying the content image and the another content image, respectively.

10. The method according to claim 9, wherein the interest in the display apparatus is calculated based on at least one of a position of the user's face and a direction of the user's pupil with respect to the display apparatus in the image of the user.

11. The method according to claim 10, wherein the selecting one of the display apparatus and the external apparatus comprises:
capturing an image of the user's face; and
determining a user interest in the display apparatus based on an angle between an axial line, toward which the user's face is directed, and a straight line connecting the user's face and a camera provided in the display apparatus configured to capture an image of the user's face.

12. The method according to claim 11, wherein it is determined that the interest in the display apparatus is high when the angle approximates 0, and that the user interest in the display apparatus decreases as the angle increases.

13. The method according to claim 9, wherein the controlling the content data to be transmitted comprises:
transmitting, if it is determined that a user interest in the external apparatus is relatively high in comparison to the user interest in the display apparatus while the display apparatus receives the content data, the content data to the external apparatus so that the external apparatus can display the content image.

14. The method according to claim 9, wherein the identifying the user comprises:
selecting reference biometric information, which corresponds to the biometric information input to the user input interface, from a database storing at least one user identification (ID) and reference biometric information corresponding to the ID; and
verifying the ID corresponding to the selected reference biometric information.

15. The method according to claim 14, wherein the identifying the user comprises:
generating the biometric information based on at least one of an image of the user's face captured by a camera of the display apparatus and the user's voice received by a microphone of the display apparatus.

16. The method according to claim 9, wherein the selecting one of the display apparatus and the external apparatus comprises:
controlling, if there are a plurality of identified users of both the display apparatus and the external apparatus, the content data to be transmitted to and displayed as the content image on the selected one of the display apparatus and the external apparatus based on a user interest of one identified user among the plurality of identified users specified by an event when the event is generated for specifying the one identified user among the plurality of identified users.

17. A server comprising:
a communication interface configured to communicate with a plurality of display apparatuses capable of processing content data to be displayed as a content image; and
a controller configured to determine whether a user of a first display apparatus among the plurality of display apparatuses is a user of a second apparatus among the plurality of apparatuses by comparing first and second user identification (ID) information respectively received from the first and second display apparatuses, select a display apparatus between the first and second display apparatus in which a user interest is relatively high, and control transmission of the content data so that a content image displayed on one among the first and second display apparatuses can be displayed on the selected display apparatus,
wherein, when the first and second display apparatuses are currently displaying the content image and another content image, respectively, and if it is determined that the user interest in the first and second display apparatuses are both higher than a preset first value or both lower than a reset second value, the controller is further configured to control each of the first and second display apparatuses to continue displaying the content image and the another content image, respectively.

* * * * *